United States Patent
Lee

(10) Patent No.: US 7,545,466 B2
(45) Date of Patent: Jun. 9, 2009

(54) LIQUID CRYSTAL DISPLAY DEVICE AND SUBSTRATE THEREFOR

(75) Inventor: Dong-Hoon Lee, Gumi-Si (KR)

(73) Assignee: LG Display Co., Ltd., Seoul (KR)

( * ) Notice: Subject to any disclaimer, the term of this patent is extended or adjusted under 35 U.S.C. 154(b) by 516 days.

(21) Appl. No.: 11/168,310

(22) Filed: Jun. 29, 2005

(65) Prior Publication Data

US 2006/0087603 A1    Apr. 27, 2006

(30) Foreign Application Priority Data

Oct. 25, 2004    (KR) .................. 10-2004-0085151

(51) Int. Cl.
*G02F 1/1335* (2006.01)
(52) U.S. Cl. ...................... 349/114; 349/106
(58) Field of Classification Search ............. 349/106, 349/109, 114
See application file for complete search history.

(56) References Cited

U.S. PATENT DOCUMENTS

| | | | |
|---|---|---|---|
| 6,208,401 B1* | 3/2001 | Wen et al. | 349/155 |
| 6,989,876 B2* | 1/2006 | Song et al. | 349/109 |
| 7,206,042 B2* | 4/2007 | Yang et al. | 349/106 |
| 7,248,315 B2* | 7/2007 | Arai et al. | 349/114 |
| 2002/0126238 A1* | 9/2002 | Matsushita et al. | 349/106 |
| 2004/0095521 A1 | 5/2004 | Song et al. | |

FOREIGN PATENT DOCUMENTS

| | | |
|---|---|---|
| JP | 61-230101 | 10/1986 |
| JP | 8-84347 A | 3/1996 |
| JP | 11-295717 A | 10/1999 |
| JP | 2002-350864 A | 12/2002 |

* cited by examiner

*Primary Examiner*—Richard H Kim
(74) *Attorney, Agent, or Firm*—Birch, Stewart, Kolasch & Birch, LLP

(57) ABSTRACT

A structure for a display device is provided. The structure includes a color filter. The color filter includes at least one color filter segment corresponding to a sub-pixel region. The color filter segment has a color filter portion and a transparent portion.

18 Claims, 5 Drawing Sheets

LIQUID CRYSTAL DISPLAY DEVICE AND SUBSTRATE THEREFOR

This Nonprovisional application claims priority under 35 U.S.C. §119(a) on Patent Application No. 10-2004-0085151 filed in Korea on Oct. 25, 2004, the entire contents of which are hereby incorporated by reference.

BACKGROUND OF THE INVENTION

1. Field of the Invention

The present invention relates to a liquid crystal display (LCD) device, and more particularly, to a liquid crystal display device and a substrate therefor.

2. Discussion of the Related Art

Until recently, display devices have typically used cathode-ray tubes (CRTs). In recent years, many efforts have been made in studying and developing various types of flat panel displays, such as liquid crystal display (LCD) devices, plasma display panels (PDPs), field emission displays (FED), and electro-luminescence displays (ELDs), as a substitute for CRTs. Of these types of flat panel displays, the LCD devices have several advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmittance of the LCD device. Thus, the LCD device displays images by varying the intensity of the induced electric field.

The two substrates for the LCD device are referred to as an array substrate and a color filter substrate. The array substrate includes gate and data lines to define a sub-pixel region, a thin film transistor and a pixel electrode. The color filter substrate includes a black matrix, a color filter and a common electrode. To display color images, the color filter includes red, green and blue color filter segments corresponding to the respective sub-pixel regions. The three sub-pixels having the red, green and blue define one pixel.

However, the LCD device using the three color filter segments has a low luminance. In other words, when a light emitted from a backlight passes through the color filter, the passed light has a luminance of 33 percent with respect to a luminance of the emitted light.

Accordingly, the LCD device further uses a white color filter segment (i.e., a transparent layer) to raise a luminance thereof.

FIG. 1 is a schematic plan view of a color filter substrate for the LCD device having red, green, blue and white color filter segments according to the related art.

As shown in FIG. 1, the red, green, blue and white color filter segments "R", "G", "B" and "W" correspond to the respective sub-pixel regions, and are arranged regularly. The four color filter segments "R", "G", "B" and "W" define one pixel 100. In a non-pixel region between adjacent sub-pixel regions, where gate and data lines and a thin film transistor of an array substrate are disposed, a black matrix 10 is disposed.

Since the related art LCD device including the white color filter segment requires array components, such as gate and data lines, a thin film transistor and a pixel electrode, for the white sub-pixel. Accordingly, production processes and costs increase, and a design for the array substrate is difficult. Further, driving integrated chips (ICs) to drive the white sub-pixel is required, and thus incidental parts and production costs are required.

SUMMARY OF THE INVENTION

Accordingly, the present invention is directed to a liquid crystal display device that substantially obviates one or more of problems due to limitations and disadvantages of the related art.

An object of the present invention is to provide a liquid crystal display device that improves luminance and production efficiency.

Another object of the present invention is to provide a liquid crystal display structure that improves luminance and production efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and described, there is provided a structure for a display device, including a color filter including at least one color filter segment corresponding to a sub-pixel region, the color filter segment having a color filter portion and a transparent portion.

According to another aspect, there is provided a liquid crystal display device including two gate lines and two data lines crossing each other to define a sub-pixel region on a substrate; and a color filter including at least one color filter segment corresponding to the sub-pixel region, the color filter segment having a color filter portion and a transparent portion.

According to another aspect, there is provided a method of forming a structure for a display device including forming a color filter including at least one color filter segment corresponding to a sub-pixel region and having a color filter portion and a transparent portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 1:
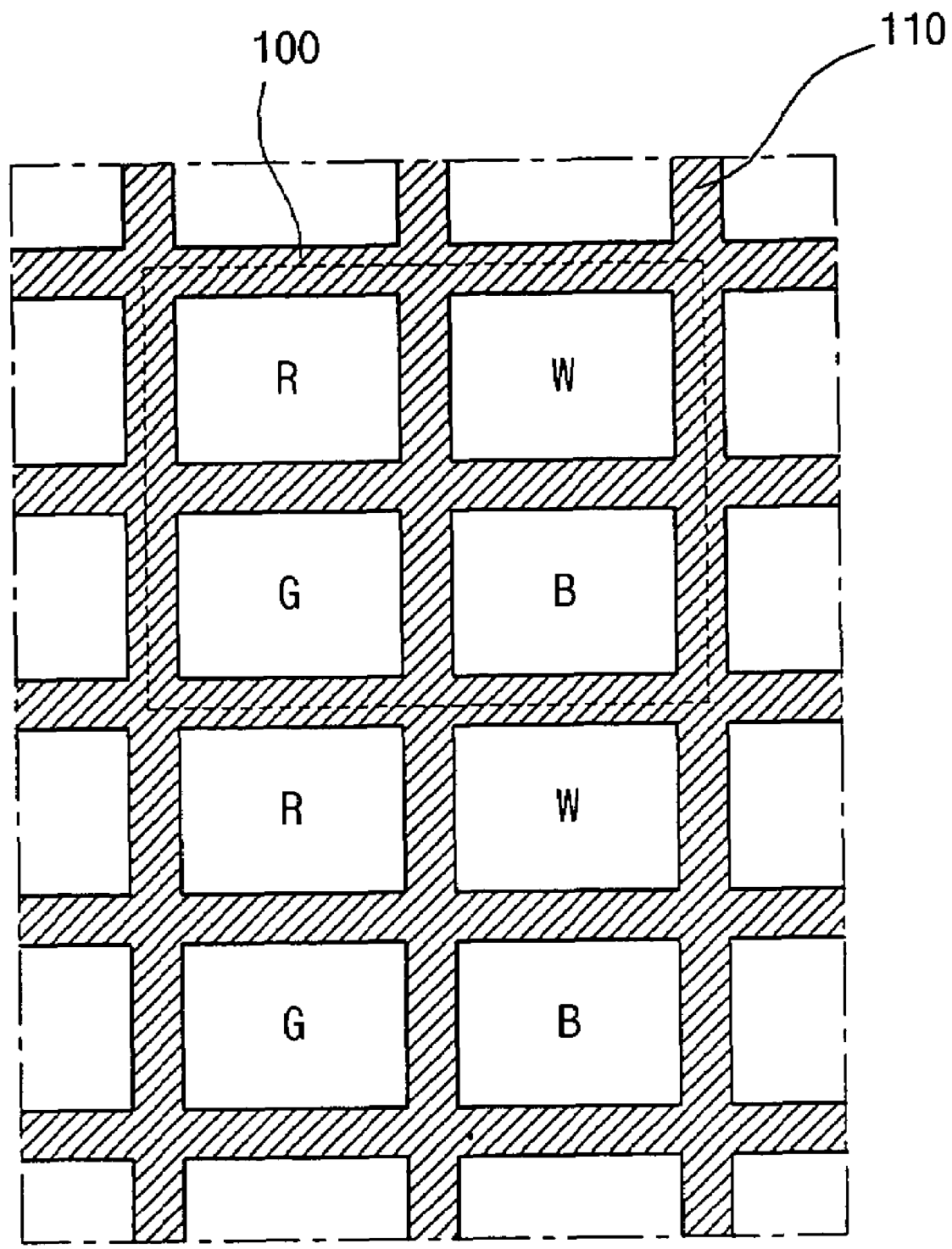
FIG. 1 is a schematic plan view of a color filter substrate for the LCD device having red, green, blue and white color filter segments according to the related art.
Figure 2A:
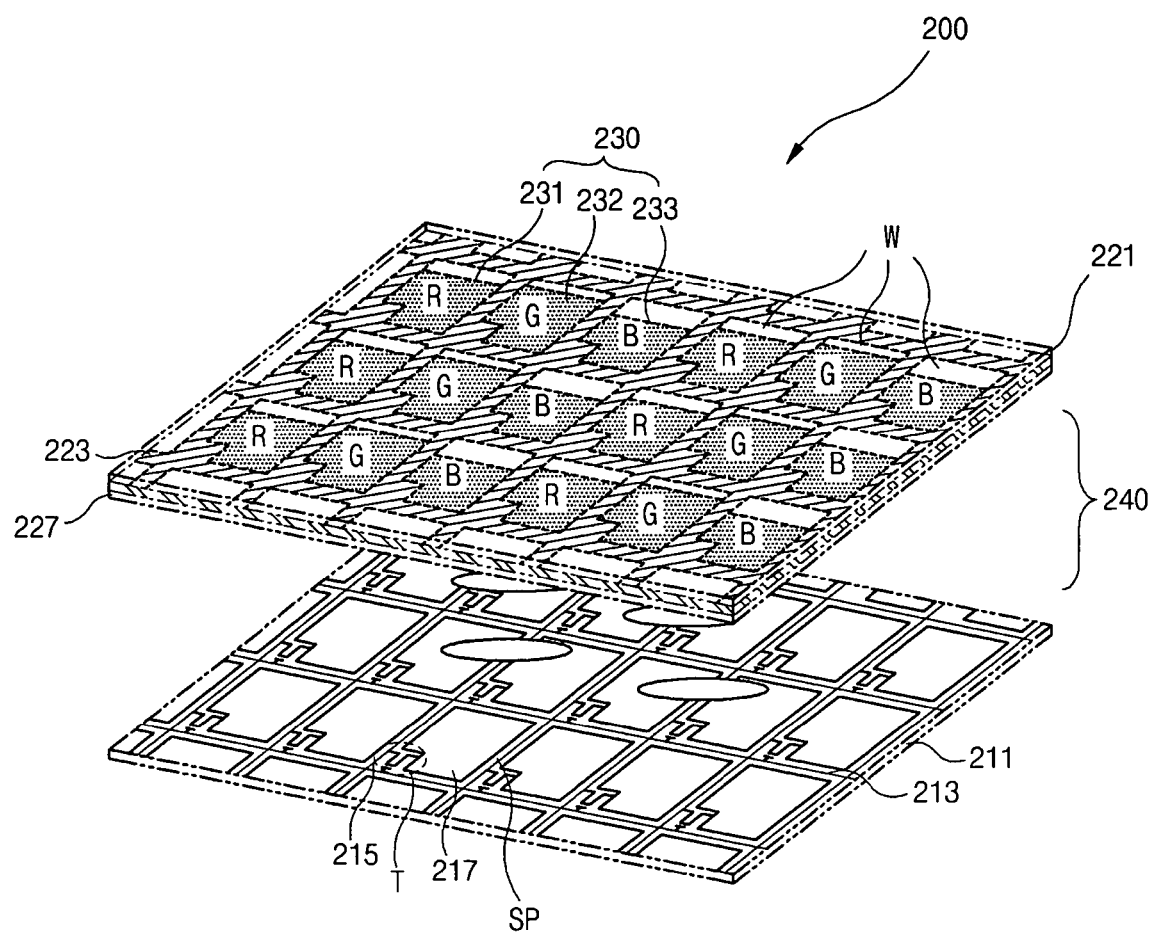
FIGS. 2A and 2B are perspective and cross-sectional views, respectively, of an LCD device according to an exemplary embodiment of the present invention.
Figure 2B:
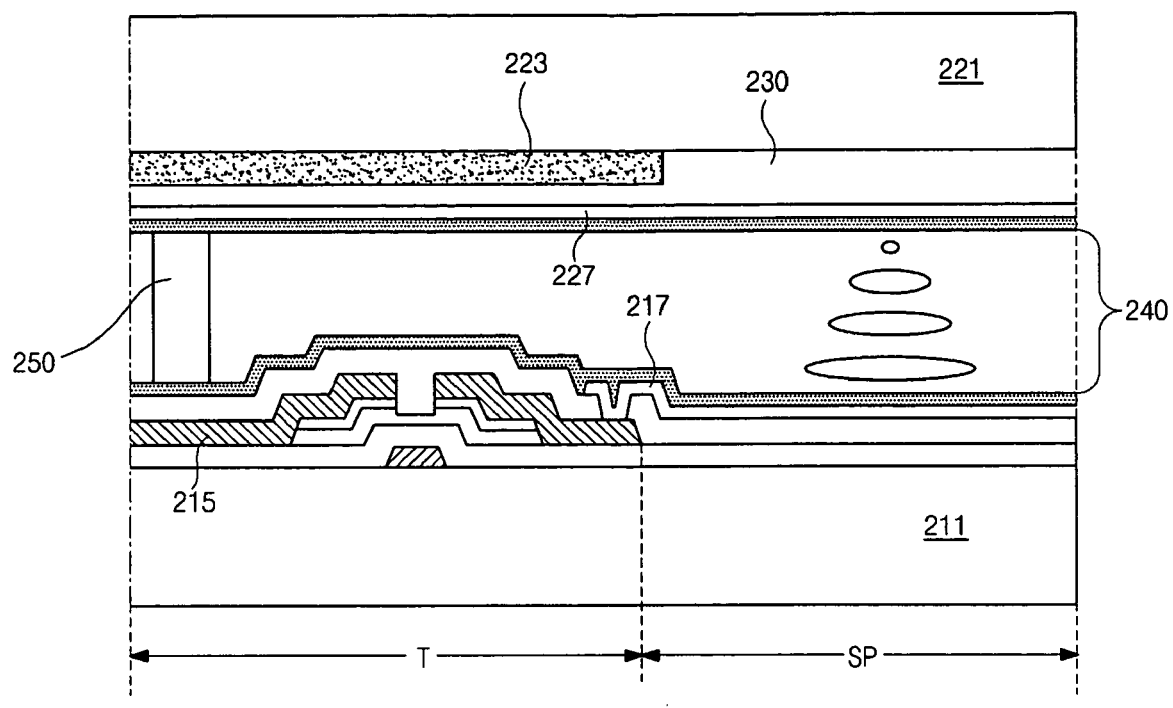

FIGS. 2A and 2B are perspective and cross-sectional views, respectively, of an LCD device according to an exemplary embodiment of the present invention.

As shown in FIGS. 2A and 2B, the LCD device 200 includes first and second substrates 211 and 221, and a liquid crystal material 240 interposed between the first and second substrates 211 and 221.

On the first substrate 211, a plurality of gate and data lines 213 and 215 cross each other to define a plurality of sub-pixel regions "SP". A thin film transistor "T" is disposed near a crossing portion of each gate and data lines 213 and 215. A pixel electrode 217 is disposed in each sub-pixel region "SP" and connected to the thin film transistor "T". A region corresponding to the gate and data lines 213 and 215 and the thin film transistor "T" is defined as a non-pixel region between adjacent sub-pixel regions On the second substrate 221, a black matrix 223 and a color filter 230 are disposed. It should be noted that although the color filter 230 is disposed on the second, upper, substrate 221 in this embodiment, the color filter 230 can also be disposed on the first, lower, substrate 211 such as a color filter on transistor (COT) structure. The black matrix 223 corresponds to the non-pixel region, i.e., the gate and data lines 213 and 215 and the thin film transistor "T". The color filter 230 corresponds to the respective sub-pixel regions "SP", and includes first, second and third color filter segments 231, 232 and 233. The first, second and third color filter segments 231, 232 and 233 define one pixel region. A common electrode 227 is disposed on the black matrix 223 and the color filter 230.

Between the first and second substrates 211 and 221, a column spacer 250 is disposed corresponding to the black matrix 223 and maintains a cell-gap between the first and second substrates 211 and 221 uniformly.

Each of the first, second and third color filter segments 231, 232 and 233 has color and transparent portions. In respective color portions of the first, second and third color filter segments 231, 232 and 233, red (R), green (G) and blue (B) color filter portions are disposed to display red, green and blue colors. In each transparent portion of the first, second and third color filters segments 231, 232 and 233, a transparent (W) portion (i.e., a white color filter portion) is disposed to display a white color. Lights incident to both the color filter portion and the transparent (W) portion in the same color filter segments 231, 232 or 233 are changed by the liquid crystal molecules having the same alignment because both the color filter portion and the transparent (W) portion in the same color filter segments 231, 232 or 233 are disposed in the same sub-pixel region "SP".

Each transparent (W) portion transmits a light that is emitted from a backlight and varies based on the alignment of liquid crystal molecules. The red (R), green (G) and blue (B) color filter portion may be made of red, green and blue color resins, respectively. The transparent (W) portion may be made of a transparent organic material, for example, the same material as the column spacer 250. The transparent (W) portion may be formed by a process different from the process of forming the column spacer 250. However, the transparent (W) portion may be formed in the same process of forming the column spacer 250.

The first, second and third color filter segments 231, 232 and 233 may have transparent portions with different areas. For example, the transparent (W) portion of the third color filter segment 233 may have an area larger than the transparent (W) portion of the first color filter segment 231, and the transparent (W) portion of the first color filter segment 231 may have an area larger than the transparent (W) portion of the second color filter segment 232. Due to such area relations of the transparent (W) portions between the first, second and third color filter segments 231, 232 and 233, luminance differences between red, green and blue colors can be compensated. In other words, among the red, green and blue colors, the green color has a highest luminance and the blue color has a lowest luminance. Accordingly, among the three transparent (W) portion of the first, second and third color filter segments 231, 232 and 233, the transparent (W) portion of the third color filter segment 233 having the blue (B) color filter portion has a largest area and the transparent (W) portion of the second color filter segment 232 having the green (G) color filter portion with a smallest area.

Figure 3A:
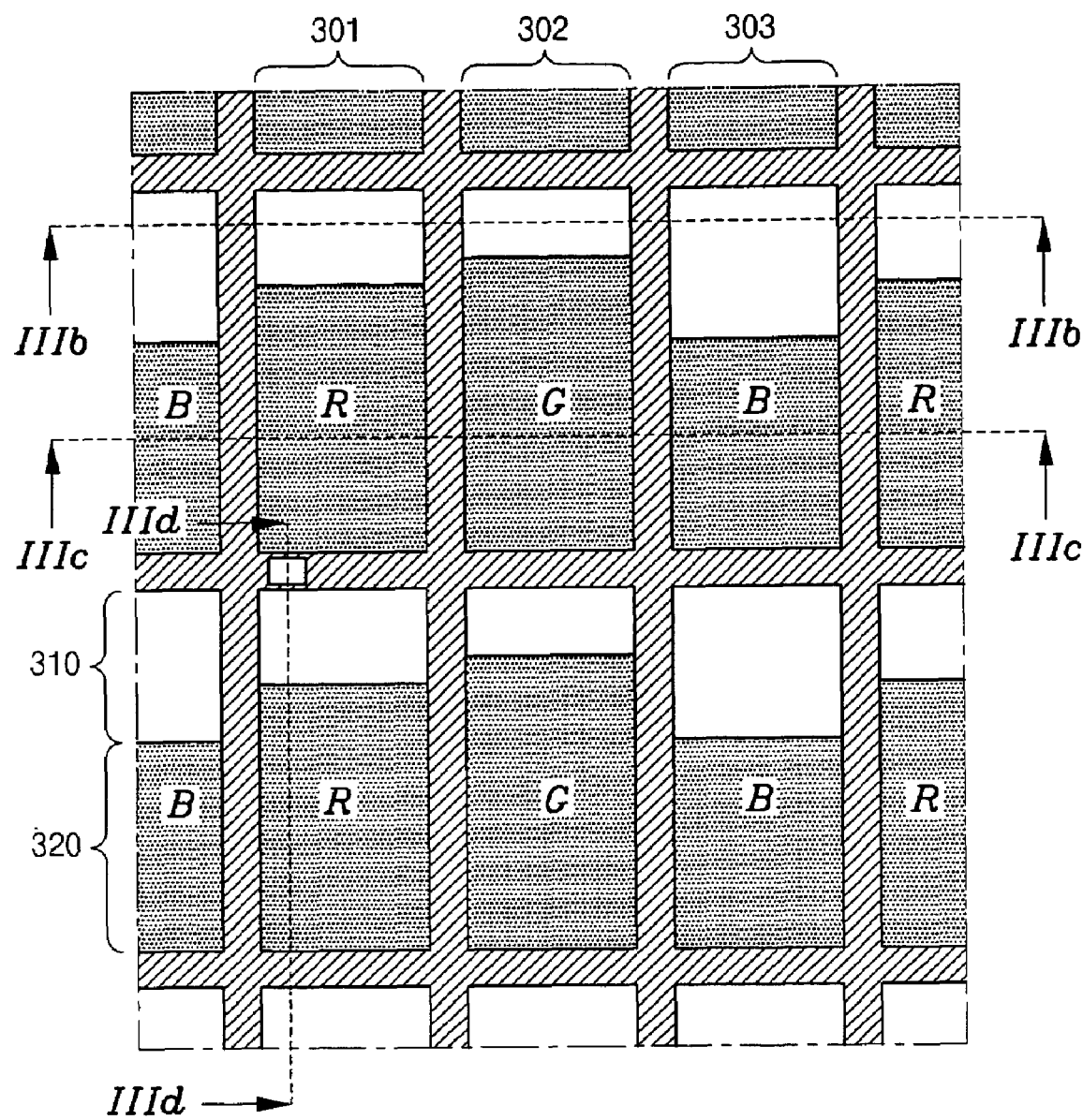
FIG. 3A is a plan view of a color filter substrate for the LCD device according to an exemplary embodiment of the present invention.
Figure 3B:
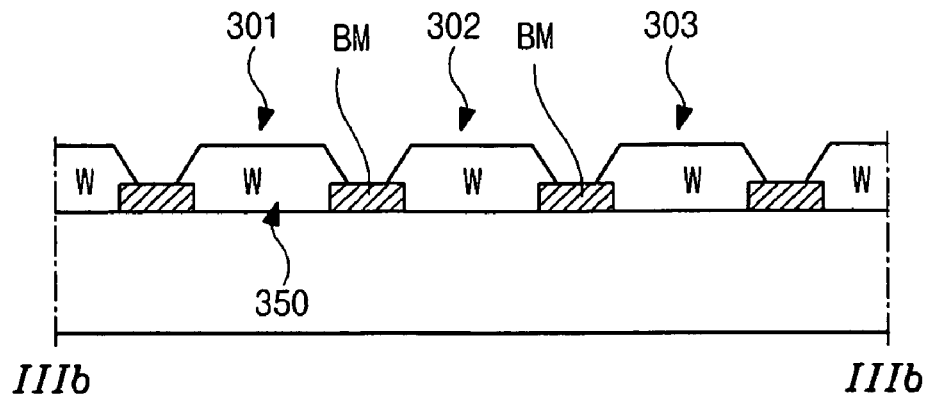
FIGS. 3B-3D are cross-sectional views taken along lines IIIb-IIIb, IIIc-IIIc and IIId-IIId of FIG. 3A, respectively.
Figure 3C:
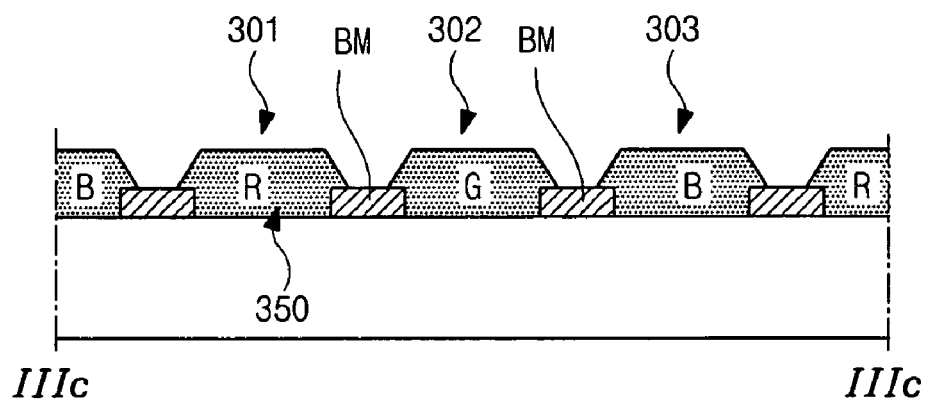
Figure 3D:
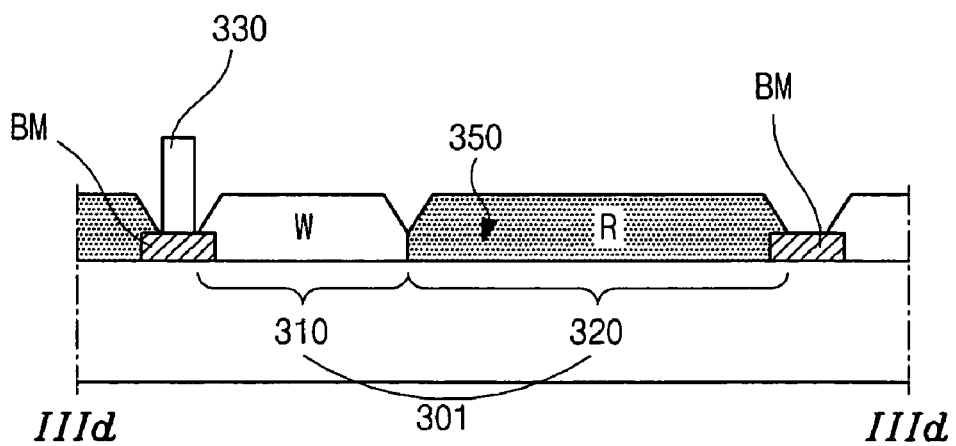

FIG. 3A is a plan view of a color filter substrate for the LCD device according to an exemplary embodiment of the present invention. FIGS. 3B-3D are cross-sectional views taken along lines IIIb-IIIb, IIIc-IIIc and IIId-IIId of FIG. 3A, respectively.

As shown in FIGS. 3A-3D, first, second and third color filter segments 301, 302 and 303 cover the respective openings 350 of a black matrix "BM" corresponding to the respective sub-pixel regions "SP" (of FIG. 2A). Each of the first, second and third color filter segments 301, 302 and 303 has a transparent portion 310 and a color portion 320.

In the respective color portions 310 of the first, second and third color filter segments 301, 302 and 303, red (R), green (G) and blue (B) color filter portion are disposed. In each transparent portion 320 of the first, second and third color filter segments 301, 302 and 303, a transparent (W) portion is disposed.

In this illustrated embodiment, the color filter portion and the transparent portion of each of the color segments are coplanar in the respective sub-pixel region. The transparent (W) portion of each color filter segment 301, 302 or 303 may have substantially the same thickness as the color filter portion of each color filter segment 301, 302 or 303 in this embodiment. If the transparent (W) portion is not formed in the transparent portion 310, a cell-gap corresponding to the transparent portion 310 is different from a cell-gap corresponding to the color portion 320. Accordingly, to maintain a cell-gap uniformly, the transparent (W) portion and the color filter portion of each color filter segment 301, 302 or 303 have the same thickness in this embodiment, as shown in FIG. 3D. In an embodiment that the color filter portion and the transparent portion are not coplanar, a uniform cell-gap can still be maintained by forming the transparent portion whose top surface substantially coincides with the top surface the color filter portion.

The transparent (W) portion may be made of the same material as a column spacer 330. The transparent (W) portion may be formed by a process different from the process of forming the column spacer 330. However, the transparent (W) portion may be formed in the same process of forming the column spacer 330. In particular, the transparent (W) portion and the column spacer 330 formed in the same process may be effectively applied to an in-plane switching (IPS) mode LCD device, where common and pixel electrodes are formed on the array substrate. To form the transparent (W) portion and the column spacer 330 in the same process, a mask having a slit portion or a semi-transparent portion may be used because the transparent (W) portion and the column spacer 330 have different thicknesses. For example, a transparent organic photosensitive material is deposited on the substrate having the color filter portions. Then the mask is arranged such that the slit pattern or the semi-transparent portion corresponds to the transparent (W) portion and one of the transparent and the blocking portions corresponds to the column spacer 330. After arranging the mask, an exposure process and a developing process are conducted, and thus the transparent (W) portion and the column spacer 330 having different thicknesses can be formed in the same process.

In the exemplary embodiment of the present invention, the color filter segment has the transparent portion as well as the red, green or blue portion. Further, at least two color filter segments have a size of the transparent portion varying from each other. Further, the transparent portion is made of the same material as the column spacer. Therefore, a luminance of the LCD device can be improved and luminance differences between the red, green and blue colorscan be compensated. Therefore, the desired luminance of each color filter segment can be obtained by adjusting the areas covered by the transparent portion of the color filter segment. In this embodiment, the first, second and third color filter segments have substantially the same luminance. However, the present invention also applies to some applications which may require different luminance in different color filter segments by simply adjusting the areas covered by the transparent portion(s). In addition, the processes can be simplified, thereby reducing the production costs.

It will be apparent to those skilled in the art that various modifications and variations can be made in the LCD device and the substrate for the LCD device of the present invention without departing from the spirit or scope of the invention. Thus, it is intended that the present invention cover the modifications and variations of this invention provided they come within the scope of the appended claims and their equivalents.

What is claimed is:

1. A structure for a display device, comprising:
   a color filter including first, second and third color fitter segments corresponding to each of sub-pixel regions, each of the first, second and third color filter segments having a color filter portion and a transparent portion,
   wherein the first, second and third color filter segments have red, green and blue color filter portions, respectively,
   wherein the transparent portion transmits a light that is emitted from a backlight, and wherein the color filter portion and the transparent portion are coplanar in each of the sub-pixel regions.

2. The structure according to claim 1, wherein the color filter portion has substantially the same thickness as the transparent portion.

3. The structure according to claim 1, wherein the color filter portion has a top surface substantially coinciding with a top surface of the transparent portion.

4. The structure according to claim 1, further comprising a black matrix between adjacent sub-pixel regions.

5. The structure according to claim 4, further comprising a column spacer on the black matrix.

6. The structure according to claim 5, wherein the transparent portion is made of the same material as the column spacer.

7. The structure according to claim 1, wherein the transparent portion of the third color filter segment has an area lager than the transparent portion of the first color filter segment, and the transparent portion of the first color filter segment has an area larger than the transparent portion of the second color filter segment.

8. The structure according to claim 1, wherein at least two of the first, second and third color filter segments have a size of the transparent portion varying from each other.

9. The structure according to claim 1, further comprising a common electrode on the color filter.

10. A liquid crystal display device, comprising:
    gate lines and data lines crossing each other to define sub-pixel regions on a substrate; and
    a color filter including first, second and third color filter segments corresponding to each of the sub-pixel regions, each of the first, second and third color filter segments having a color filter portion and a transparent portion,
    wherein the first, second and third color filter segments have red, green and blue color filter portions, respectively,
    wherein the transparent portion transmits a light that is emitted from a backlight, and wherein the color filter portion and the transparent portion are coplanar in each of the sub-pixel regions.

11. The device according to claim 10, wherein the color filter portion has substantially the same thickness as the transparent portion.

12. The device according to claim 10, wherein the transparent portion of the third color filter segment has an area larger roan the transparent portion of the first color filter segment, and the transparent portion of the first color filter segment has an area larger than the transparent portion of the second color filter segment.

13. The device according to claim 10, wherein at least two of the first, second and third color filter segments have a size of the transparent portion varying from each other.

14. The device according to claim 10, further comprising a common electrode on the color filter.

15. A method of forming a structure for a display device, comprising:
    forming a color filter including first, second and third color filter segments corresponding to each of sub-pixel regions, each of the first, second and third color filter segments having a color filter portion and a transparent portion,
    wherein the first, second and third color filter segments have red, green and blue color filter portions, respectively,
    wherein the transparent portion transmits a light that is emitted from a backlight, and wherein the color filter portion and the transparent portion are coplanar in each of the sub-pixel regions.

16. The method of claim 15, further comprising forming two adjacent data lines crossing two adjacent gate lines to define the sub-pixel region.

17. The method of claim 15, further comprising forming at least two of the first, second and third color filter segments having a size of the transparent portion varying from each other.

18. The method of claim 15, wherein the step of forming the color filter includes:
    forming the color filter portion; and
    forming the transparent portion having a top surface substantially coinciding with a top surface of the color filter portion.

* * * * *